(12) United States Patent
Hench

(10) Patent No.: US 11,668,278 B2
(45) Date of Patent: *Jun. 6, 2023

(54) MASTLESS WIND TURBINE FOR POWER GENERATION

(71) Applicant: Steven C. Hench, Dallas, TX (US)

(72) Inventor: Steven C. Hench, Dallas, TX (US)

(73) Assignee: J. Hench Consulting, Inc., Benbrook, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/321,271

(22) Filed: May 14, 2021

(65) Prior Publication Data

US 2021/0270234 A1 Sep. 2, 2021

Related U.S. Application Data

(63) Continuation of application No. 15/901,701, filed on Feb. 21, 2018, now Pat. No. 11,009,004, which is a
(Continued)

(51) Int. Cl.
*F03D 3/00* (2006.01)
*F03D 3/06* (2006.01)
(Continued)

(52) U.S. Cl.
CPC ............. *F03D 3/005* (2013.01); *F03D 3/062* (2013.01); *F03D 3/064* (2013.01); *F03D 9/11* (2016.05);
(Continued)

(58) Field of Classification Search
CPC . F03D 3/005; F03D 3/06; F03D 3/062; F03D 3/064; F03D 9/25; F05B 2240/211; F05B 2240/311
(Continued)

(56) References Cited

U.S. PATENT DOCUMENTS 4,708,592 A 11/1987 Krolick et al.
2010/0278629 A1* 11/2010 Krippene .............. F03D 3/0436
415/58.4
(Continued)

FOREIGN PATENT DOCUMENTS

WO WO-2011011018 A1 1/2011
WO WO-2014195640 A1 12/2014

OTHER PUBLICATIONS

European Patent Office, Extended European Seach Report issued for European Patent Application No. 17876489.0, dated Aug. 18, 2020, 7 pages.

*Primary Examiner* — Eldon T Brockman
*Assistant Examiner* — Maxime M Adjagbe
(74) *Attorney, Agent, or Firm* — Norton Rose Fulbright US LLP

(57) ABSTRACT

A mastless vertical axis wind turbine that comprises a plurality of sails that rotate about a vertical axis under the influence of wind. A platform is connected to and in tension with the plurality of sails at one or more points about the bottom of the plurality of the sails. Also, an external frame is connected to and in tension with the plurality of sails at one or more points about the top of the plurality of the sails. The external frame itself comprises a plurality of legs that converge above the plurality of sails at a central point about the vertical axis of rotation and extend beyond the path swept by the plurality of sails. A coupling mechanism connects one or more of the plurality of legs to the plurality of sails and allows the sails to rotate about the vertical axis of rotation while the legs remain stationary.

25 Claims, 10 Drawing Sheets

Related U.S. Application Data continuation of application No. 15/368,303, filed on Dec. 2, 2016, now Pat. No. 9,995,275.

(60) Provisional application No. 62/237,076, filed on Oct. 5, 2015.

(51) Int. Cl.
    *F03D 9/11*     (2016.01)
    *F03D 9/25*     (2016.01)

(52) U.S. Cl.
    CPC ............ *F03D 9/25* (2016.05); *F05B 2210/16* (2013.01); *F05B 2240/211* (2013.01); *F05B 2240/311* (2013.01); *Y02B 10/30* (2013.01); *Y02E 10/74* (2013.01)

(58) Field of Classification Search
    USPC ........... 416/132 A, 132 B; 415/4, 1, 4.2, 4.3, 415/4.4, 4.5
See application file for complete search history.

(56) References Cited

U.S. PATENT DOCUMENTS

| | | | |
|---|---|---|---|
| 2011/0006540 A1 | 1/2011 | Ignatiev et al. | |
| 2012/0068465 A1* | 3/2012 | Dawoud | F03D 3/062 290/55 |
| 2013/0106193 A1* | 5/2013 | Bryson | H02S 10/10 307/73 |
| 2013/0115086 A1* | 5/2013 | Hench | F03D 3/065 416/132 A |
| 2014/0227094 A1* | 8/2014 | Xia | F03D 1/0633 416/9 |
| 2015/0110598 A1* | 4/2015 | Lee | F03D 3/068 415/4.2 |

* cited by examiner

MASTLESS WIND TURBINE FOR POWER GENERATION

CROSS-REFERENCE TO RELATED APPLICATIONS

The present application is a continuation of U.S. patent application Ser. No. 15/901,701 filed Feb. 21, 2018, that issued as U.S. Pat. No. 11,009,004 on May 18, 2021, and entitled "MASTLESS WIND TURBINE FOR POWER GENERATION"; which is a continuation of U.S. patent application Ser. No. 15/368,303 filed Dec. 2, 2016, that issued as U.S. Pat. No. 9,995,275 on Jun. 12, 2018, and entitled "MASTLESS WIND TURBINE FOR POWER GENERATION"; which claims the benefit of U.S. Provisional Patent Application No. 62/237,076 filed Oct. 5, 2015, and entitled, "WIND TURBINES AND OTHER TURBINES FOR POWER GENERATION", the disclosures of which are hereby incorporated herein by reference in their entirety.

TECHNICAL FIELD

The present disclosure relates to wind turbines. In particular, the present disclosure relates to mastless wind turbines having sails that are placed under tension at or near their bottom edge and at or near their top edge.

BACKGROUND OF THE INVENTION

Commonly used wind turbines, particularly those that rotate about a vertical axis, are mechanically inefficient, cumbersome, and relatively expensive. A contributing factor to these difficulties is the fact that known wind turbines that rotate about a vertical axis rely upon a central mast extending upward from the bottom of the turbine to anchor rotating vanes. During operation, the central mast rotates with vanes to which it is attached. Including such a mast not only increases cost and weight of required material, but also induces mechanical problems. Torsional forces between the vanes, the mast, and bottom surface give rise to mechanical inefficiencies and breakdown. As such, known wind turbines of these types are difficult to deploy and maintain energy output, particularly under varying wind conditions.

Further, known vertical axis wind turbines utilize blades and/or wheels that can be heavy, unsightly, dangerous to wildlife, and difficult to transport. Rotation of the heavy blades and/or wheels can cause damage to surrounding objects, such as animals, as well as the blades and/or wheels themselves.

BRIEF SUMMARY

In various embodiments, a turbine may be utilized to generate energy. The turbine can include a frame, base, and sails. One or more sails can be coupled at an end to the base. One or more of sails 130 can be coupled to frame 110. As sails 130 rotate, power can be generated. Embodiments can include one or more of the following features. frame 110 can be external. frame 110 can be shaped approximately as a triangular pyramid. The turbine can include six (6) sails. Base 120 can include an open frame with a hexagonal hub and 6 spokes.

According to certain aspects, a mastless turbine comprises a plurality of sails that rotate about a vertical axis under the influence of wind. The turbine also comprises a bottom platform configured to couple the plurality of sails to a first stationary support. During operation of the mastless vertical axis wind turbine, the bottom platform connects to and is in tension with the plurality of sails at one or more points about the bottom of the plurality of the sails and rotates with the plurality of sails under the influence of wind. The turbine further comprises a connector that is configured to couple the plurality of sails to a second stationary support. During operation of the mastless vertical axis wind turbine, the connector connects to and is in tension with the plurality of sails about the axis of rotation and the top of the plurality of the sails. The central connector itself comprises a top portion configured to attach to the second stationary support that during operation of the mastless vertical axis wind turbine does not rotate. The central connector also comprises a bottom portion configured to attach to the plurality of the sails that during operation of the mastless vertical axis wind turbine rotates with respect to the top portion with the plurality of sails under the influence of wind.

The details of one or more embodiments are set forth in the accompanying drawings and the description below. Other features, objects, and advantages of the embodiments will be apparent from the description and drawings.

The foregoing has outlined rather broadly the features and technical advantages of the present invention in order that the detailed description of the invention that follows can be better understood. Additional features and advantages of the invention will be described hereinafter which form the subject of the claims of the invention. It should be appreciated by those skilled in the art that the conception and specific embodiment disclosed can be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1A:
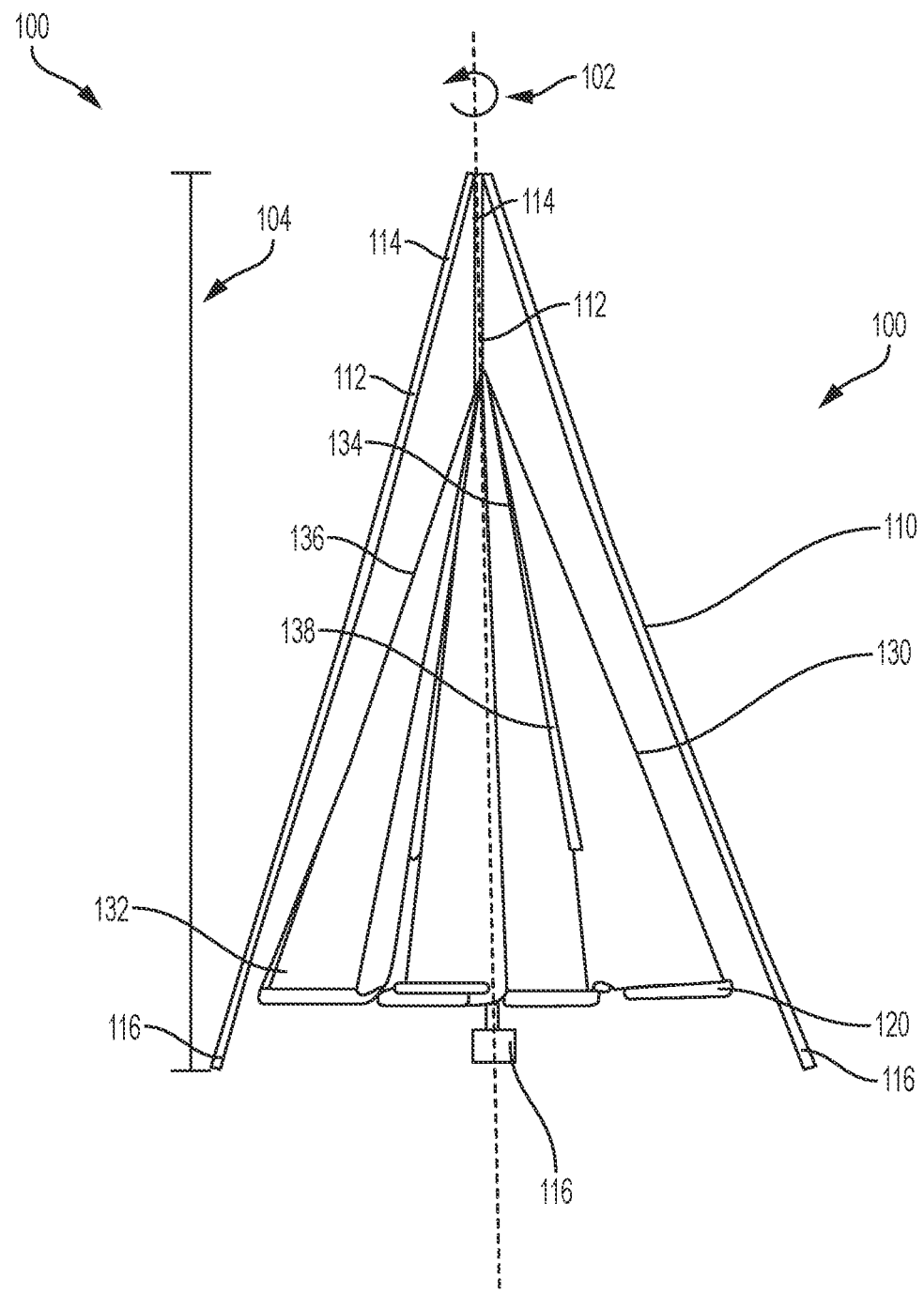
FIG. 1A illustrates an embodiment of a wind turbine according to an embodiment.

In various embodiments, a wind turbine rotates about a vertical axis to generate energy under the influence of wind. The vanes or sails of the turbine are placed under tension by attaching the bottom of each vane to a platform and the top of each vane to a structure or top tension point positioned about the center of the axis of rotation. The top tension point can comprise an external structure that is supported around the turbine, or may comprise a top attachment point. The latter is advantageous where, e.g., the turbine is reversibly installed at various locations where an external support cannot be placed about the turbine. In either case, as a result, the need for a central mast is obviated.

In operation, the vanes converge toward the top of the turbine, i.e., where each vane connects to the central structure or tension point at their top edge. The configuration of the vanes can be changed by adjusting the position at which the vanes attach to the platform at their bottom edge and the central top tension point.

As the turbine rotates, kinetic energy is generated and then converted to electrical energy (e.g., via a generator), which can be utilized to drive machines (e.g., pumps, air compressors, motors, etc.) and/or can be stored (e.g., in batteries, hydrogen (or other chemical form), high-pressure steam (or other physical form), and/or as compressed air, and the like). A turbine can be part of a turbine array and used in conjunction with an energy storage unit. To that end, an energy storage unit can be utilized in conjunction with one or more turbines in the array and used to efficiently distribute energy to local or remote locations.

Importantly, the energy storage unit can be utilized in conjunction with the one or more turbines to produce a constant or near constant energy output over time and under varying conditions. That is, during operation, all or a portion of the energy generated by the one or more turbines can be distributed to the energy storage unit. During periods of low wind speed, and likewise, low turbine power output, the energy storage unit can be used to increase overall energy output to compensate for a decrease in turbine energy output. During periods of high wind speed, and likewise, high turbine power output, the energy storage unit can be used to provide no or minimal energy output to maintain overall energy output at a constant or near constant level.

In view of the foregoing, described embodiments provide a mastless vertical axis wind turbine that comprises a plurality of sails that rotate about a vertical axis under the influence of wind. A platform is connected to and in tension with the plurality of sails at one or more points about the bottom of the plurality of sails. Also, an external frame is connected to and in tension with the plurality of sails at one or more points about the top of the plurality of the sails. The external frame itself comprises a plurality of legs that converge above the plurality of sails at a central point about the vertical axis of rotation and extend beyond the path swept by the plurality of sails. Also, a coupling mechanism connects one or more of the plurality of legs to the plurality of sails and is configured allow the plurality of sails to rotate about the vertical axis of rotation while the plurality of legs remain stationary.

A generator in communication with the platform that generates energy in response to rotation of the platform. In some embodiments, the generator is centrally aligned with the vertical axis of rotation and can be in communication with one or more energy storage units. To regulate energy output of the turbine over time as discussed above, a controller can operate to cause the energy storage units to increase energy output in response to a decrease in generator energy output and decrease energy output in response to an increase in generator energy output.

Figure 1B:
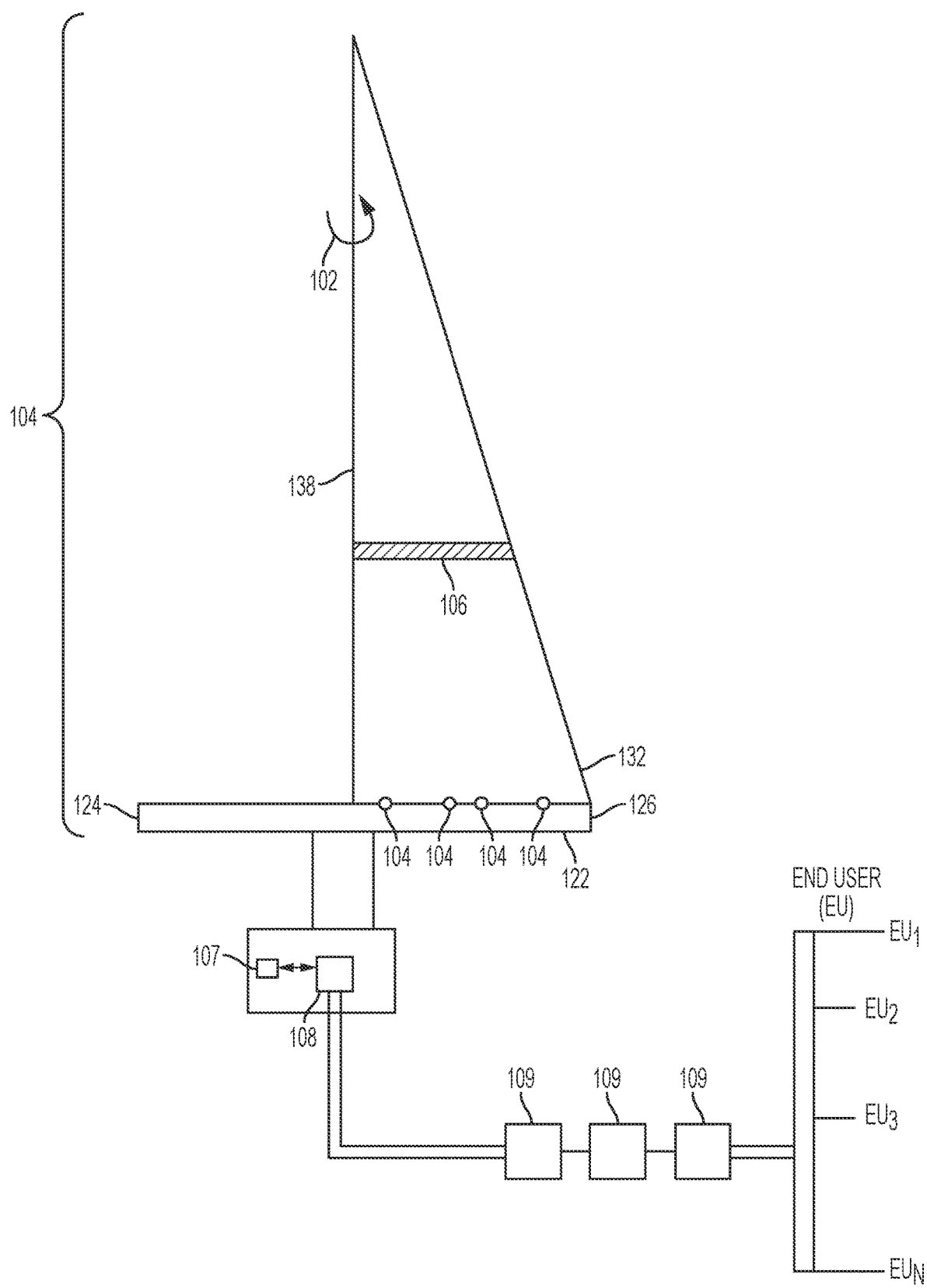
FIG. 1B illustrates a cross section portion of a wind turbine in communication with an energy regulation mechanism according to an embodiment.
Figure 1C:
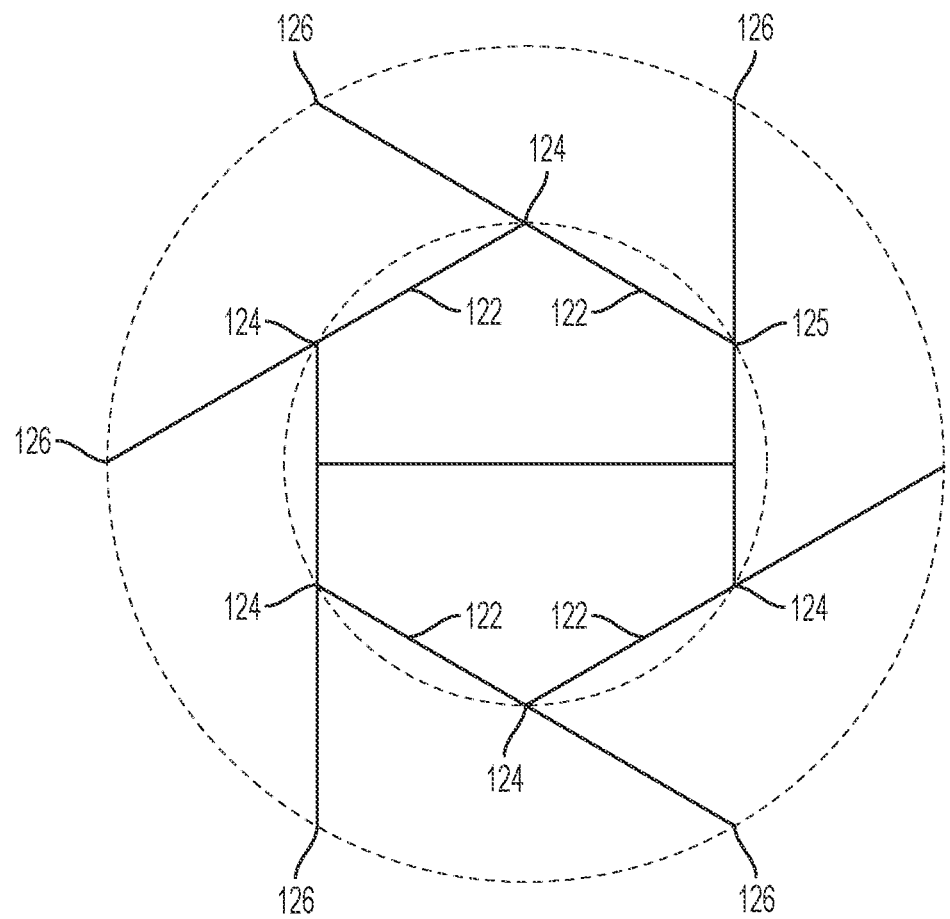
FIG. 1C illustrates a platform of a wind turbine according to an embodiment.

FIG. 1A illustrates an embodiment of turbine 100, FIG. 1B illustrates a cross section of a first portion of turbine 100 illustrated in FIG. 1A, and FIG. 1C illustrates a platform or second portion of turbine 100 illustrated in FIG. 1A. Turbine 100 can be used to generate energy (e.g., mechanical and/or electrical) from air flow. For example, turbine 100 can be positioned in an area and subject to air flow (e.g., high wind speed and low wind speed).

Turbine 100 includes frame 110, rotating platform or base 120, and a plurality of vanes or sails 130. According to the illustrated embodiment, frame 110 is an external frame (e.g., external to sails 130) and operates to support and place tension on sails 130 in an upward direction. By placing sails 130 under sufficient tension using frame 110, (1) sails 130 efficiently rotate in response to wind, and (2) the need for a central mast attaching to sails 130 is eliminated. Also, as mentioned, according to another embodiment, tension may be placed on sails 130 by attaching each to a central point of tension that does not further comprise an external frame. In such embodiments, sails 130 can connect to a central hook or the like where the hook is free to rotate at one end while it is held stationary at another end. This may be effectuate through the use of bearings or the like, and is advantageous where turbine 100 is installed in compact locations where an external frame would not fit.

Frame 110 can include any appropriate material to provide the appropriate strength to turbine 100. Frame 110 can at least partially support sails 130 and/or base 120, and can be self-erecting and/or manually erected (e.g., by a person).

In some embodiments, frame 110 includes at least three legs 112. Legs 112 each have top end 114 and opposing bottom end 116 and 112 can be positioned such that top ends 114 are disposed proximate each other while bottom ends 116 are spaced from one another about the circumference of the circle swept out by sails 130 and/or base 120. Therefore, the ends of legs 112 are uncoupled at or about a bottom portion of frame 110, and coupled (e.g., directly or indirectly) at or about a top end of frame 110. For example, frame 110 can have three legs 112 in a shape arranged as a triangular pyramid, where top end 114 of each leg 112 converges near the axis of rotation of sails 130 while bottom ends 116 of each leg 112 are spaced from one another about the circumference of the circle swept out by sails 130 and/or base 120.

In some embodiments, the ratio of a height of frame 110 to a width of frame 110 can be between approximately from 1-to-1 to 2-to-1, while in a preferred embodiment the ratio of the height of frame 110 to the width of frame 110 is approximately 1.3 to approximately 1. However, it should be appreciated that frame 110 can be any height, even much greater than that of rotating turbine 100 itself. An example might be to increase the ground clearance of turbine 100 for any number of reasons.

Further, the size of frame 110 can be selected to allow sails 130 to rotate within frame 110 without contacting legs 112. The ratio of the height of frame 110 to the width of frame 110 can be approximately the same as the ratio of the height of sail 130 to the width of sail 130, and the overall height of frame 110 can be larger than the overall height of sail 130.

Platform or base 120 can include any appropriate material, such as metal, fiber reinforced plastics, and/or wood. Preferably, to reduce weight of turbine 100, base 120 can comprise an open frame (e.g., at least approximately 50% of the footprint of base 120 is open and/or components of base 120 comprise an area of less than approximately 50% of the footprint of base 120).

Sails 130 can rotate in the presence of a fluid flow (e.g., wind) about a central axis of rotation 102 to generate energy. Sails 130 can have a shape that is wider at bottom end 132 than at top end 134 where, e.g., sails 130 can be approximately triangularly-shaped or approximately trapezoidally-shaped. When sails 130 are positioned in turbine 100, exterior side 136 of sails 130 can form an approximately conical shape and/or at least a portion of a conical shape. In some embodiments, the ratio of a height of a sail 130 to a width of a sail 130 can be approximately 2-to-1. In a preferred embodiment, the ratio of the height of sail 130 to the width of sail 130 can be approximately 1.3 to approximately 1.

Turbine 100 can include an even or odd number of sails 130, where each may be formed of any appropriate material. In some embodiments, sails 130 can include a material that allows each sail 130 to collapse, be rolled, and/or otherwise reduced in size for storage, transport, and/or other appropriate reasons (e.g., winds exceeding a predetermined maximum velocity).

Referring to FIG. 1A and FIG. 1B, each sail 130 has bottom end 132 and top end 134. At least a portion of bottom end 132 can be coupled to base 120 at attachment points 104. Bottom end 132 can extend along a length of base 120. In some embodiments, the width of sail 130 can be approximately the same as the length of base 120. At least a portion of top end 134 can be coupled directly or indirectly to frame 110 or another top tension point.

For example, sails 130 can be coupled together and/or coupled to a connector (not shown) that couples to frame 110 (e.g., a top portion of frame 110 where legs 112 are coupled). A gap can be disposed between top ends 134 of sails 130 and bottom ends 132 of legs 112. This gap can facilitate rotation of sails 130 and/or connection of sails 130 to frame 110. Bottom ends 132 of each sail 130 of turbine 100 can be proximate to bottom ends 116 of legs 112. For example, top end 134 of each sail 130 can be a point, and each pointed end of sails 130 can meet and be coupled (e.g., coupled to allow rotation of sails 130) via a connector.

The connector can directly couple sails 130 to frame 110. In some embodiments, sails 130 can extend along the entire height 104 (e.g., distance in the direction of central axis of rotation 102) of turbine 100. Otherwise, sails 130 can extend only partially along height 104 of turbine 100 and a connector can have a length that allows sails 130 to be connected to frame 110.

Sails 130 also include exterior side 136 and opposing interior side 138, both disposed between bottom end 132 and top end 134. At least a portion of exterior side 136 and/or at least a portion of interior side 138 can be free (e.g., not coupled to other sails, frame 110, and/or the base). By allowing the sides of sails 130 to be at least partially free, dead zones (e.g., areas of zero or negligible fluid flow) can be reduced (e.g., when compared with a sail in which the interior side is coupled to a post). The lack of a mast, which would serve as an obstruction to the crossflow of air between vanes, is also beneficial because it allows air to flow between vanes, further improving operating efficiency. This distinguishes described embodiments from most rigid-vane crossflow wind turbines, which have additional structures external to the rotating turbine to channel airflow from a larger swept area into the smaller turbine. This is done to reduce the already high cost of large-scale rigid-vane crossflow designs. Accordingly, described embodiment avoid cost problems or mechanical/operational problems associated with crossflow vertical-axis wind turbines Further, the vertical taper of described embodiments increases stability, especially in high-speed or gusty winds. In contrast, known cylindrical crossflow designs require an additional structure at the top to hold the vanes in place, basically identical to what is used at the bottom (or opposite end of the turbine). Although the swept area is greater, the costs and mechanical issues have been demonstrated in practice to not be worth it.

In some embodiments, connectors can couple proximate corners of sails 130. For example, a connector (e.g., a chain linkable to a grommet on a sail) can couple each corner of top end 134 of the trapezoidally shaped sail 130. The connectors can meet at a common point and couple to frame 110. In some embodiments, other shapes can be utilized as appropriate. Further, sails 130 and/or connectors can couple at a common point prior to coupling to frame 110. For example, connector(s) can couple with ends of triangularly shaped sails 130 at a common point (e.g., a single connector can couple all sails 130 and/or multiple connectors can be utilized to couple two or more sails together). The connector can extend from the common point to frame 110 (e.g., to couple proximate the second end of Legs 112). In some embodiments, when sails 130 and the connectors are coupled, an approximately conical shape (e.g., area of rotation of sail 130 and/or including the area disposed between connectors) or portion thereof can be formed.

Sail 130 can include batten or cross-member 106 to inhibit cupping of sail 130 during rotation. Cupping can increase drag of sail 130 and therefore reduce power generation of a turbine. Sail 130 can include an opening (e.g., sleeve, pocket, recess, etc.) to receive a cross-member. For example, sail 130 can include one or more sleeves disposed between its interior side and exterior side. Cross-member(s) 106 can be disposed (e.g., removable and/or fixedly) in the sleeve(s), can be disposed in turbine 100 parallel to the edge of interior end 138 of sail 130 and/or approximately perpendicular to central axis (e.g., axis of rotation) 102.

Referring to FIG. 1C, base 120 includes a plurality of spokes 122. According to the illustrated embodiment, six (6) of spars or spokes 122 have similar shapes and/or sizes. By utilizing spokes 122 with similar sizes, installation of turbine 100 is simplified (e.g., when compared with base members that have different size pieces) since spokes 122 are not required to be individually labeled and/or positioned.

Each spoke 122 includes interior end 124 and opposing exterior end 126. As illustrated, interior end 124 of each spoke 122 can be coupled to another spoke 122 and the exterior end 126 of each spoke 122 can be free (e.g., not coupled to another spoke 122). Spokes 122 can be coupled together to form an approximately hexagonally-shaped hub 128 with six (6) free ends (e.g., exterior ends) of spokes 122 radially disposed about hub 128.

Figure 1D:
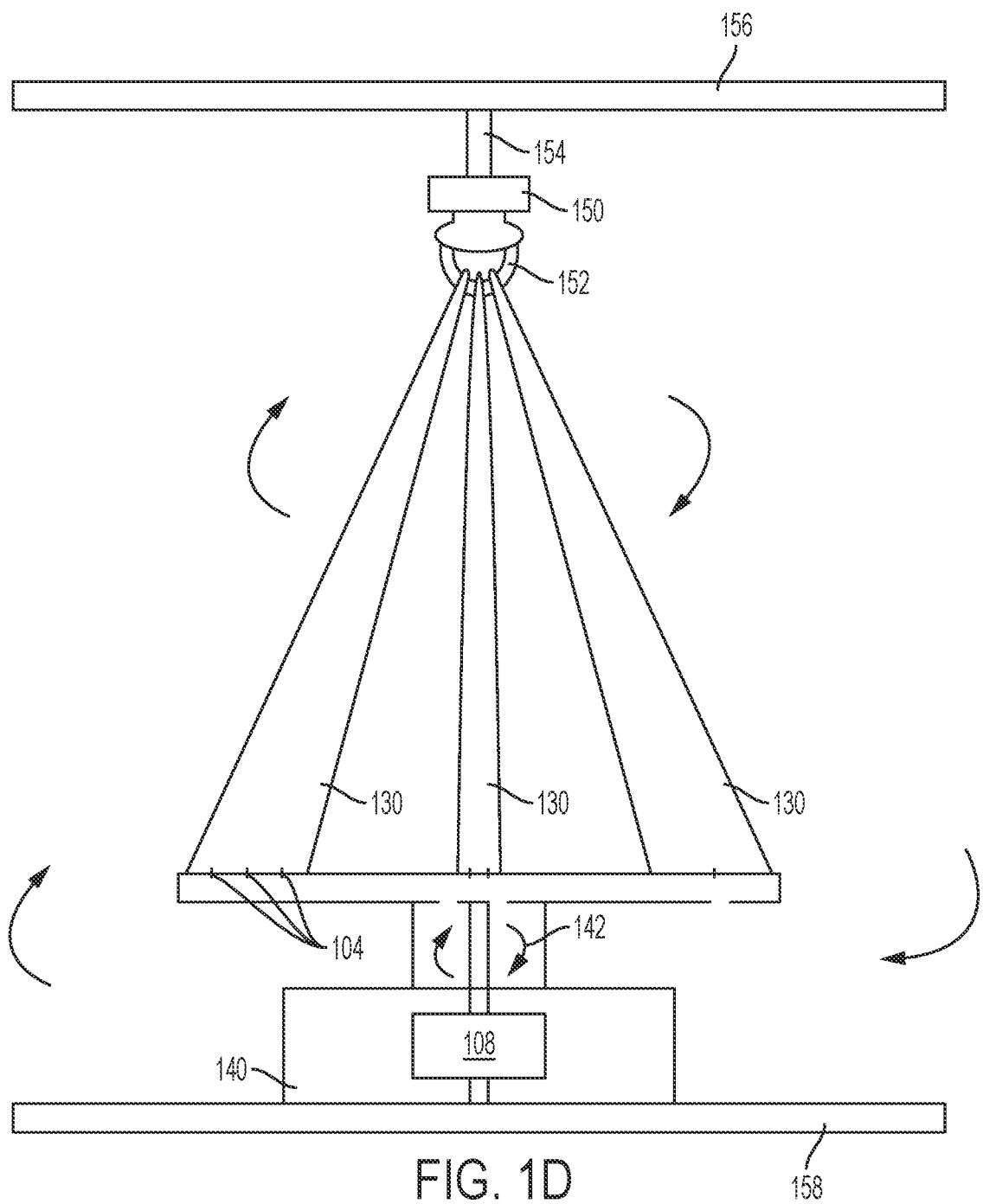
FIG. 1D illustrates aspects of an embodiment of a wind turbine according to an embodiment.

FIG. 1D illustrates an embodiment of mastless turbine 100 where an external frame is not utilized. Instead, a central connector is utilized to couple sails 130 to a stationary support, such as support 156. As mentioned, such embodiments are useful where turbine 100 is implemented in locations that are mobile or the like. According to the illustrated embodiment, turbine sails 130 are placed at tension about their top edges by meeting at a central connecting point 150 that is allowed to rotate at its lower end 152, while remaining fixed at its top end 154. This can be effectuated by using a bearing mechanism or the like. Sails 130 attach to connecting point lower end 152, which can comprise a hook, loop, latch, or the like, that reversibly couples to sails 130. During operation, connecting point lower end 152 rotates with respect to connecting point top end 154, which does not rotate. Further connecting top point 154 attaches to stationary support 156. Support 156 can be any component sufficient to support the weight of connecting point 150 and supports same when turbine 100 is placed under tension at connecting point 150. In some embodiments, support 156 can be a guideline or rail on a watercraft, and the like. Further, several of turbines 100 can be placed along the length of support 156 in daisy chain fashion, providing an array of turbines 100. In this embodiment, platform 142 and stand 140 can be components sufficient to place tension on turbine 100 about the bottom edges of sails 130 while remaining fixed to a bottom stationary support 158. While not required, in the illustrated embodiment generator 108 is housed within stand 140 and rotates therein in response to the rotation of sails 130. Further, bottom stationary support 158 can be a fixed component in a watercraft or the like. As one can see, such an embodiment is advantageous because it can be implemented in positions that are themselves mobile or otherwise inaccessible to turbines that require a fixed central mast.

Figure 2:
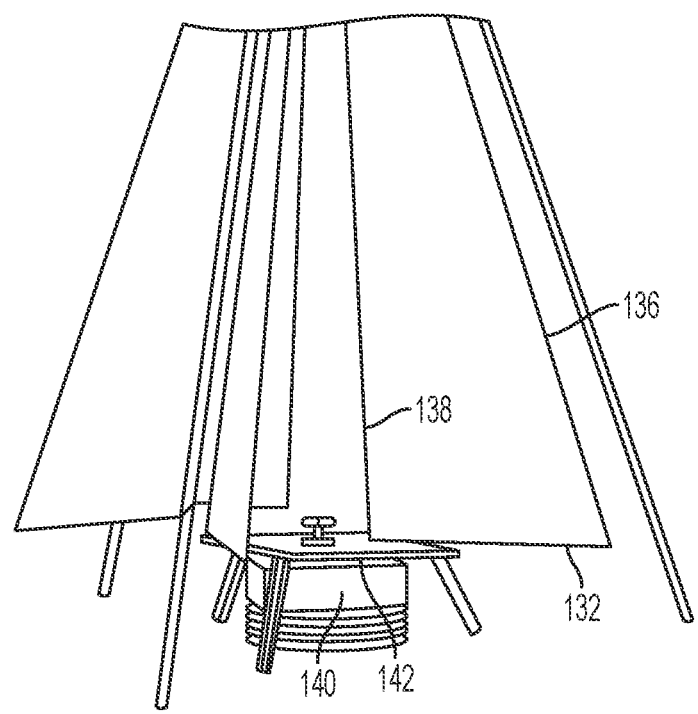
FIG. 2 illustrates aspects of an embodiment of a wind turbine according to an embodiment.
Figure 3A:
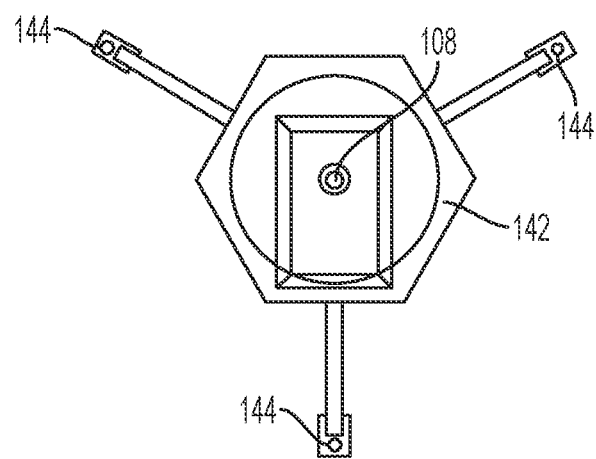
FIG. 3A illustrates aspects of a platform of a wind turbine according to an embodiment.
Figure 3B:
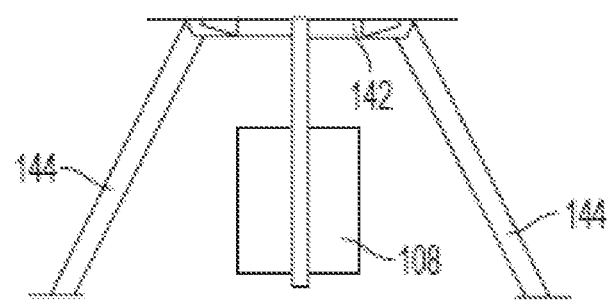
FIG. 3B illustrates additional aspects of a platform of a wind turbine according to an embodiment.
Figure 3C:
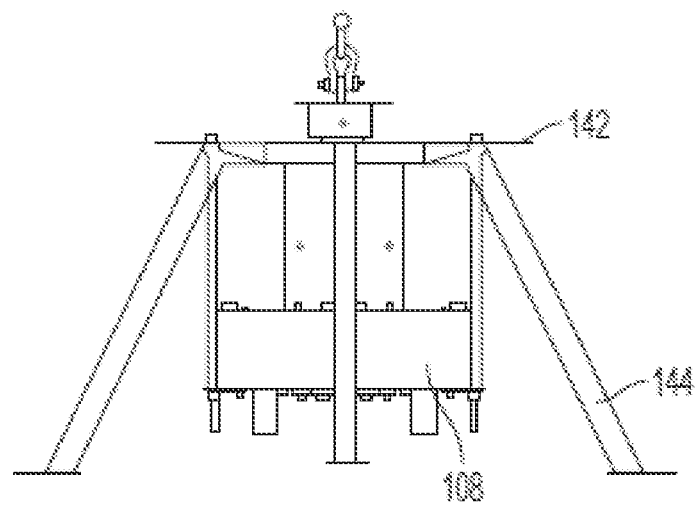
FIG. 3C illustrates additional aspects of a platform of a wind turbine according to an embodiment.
Figure 3D:
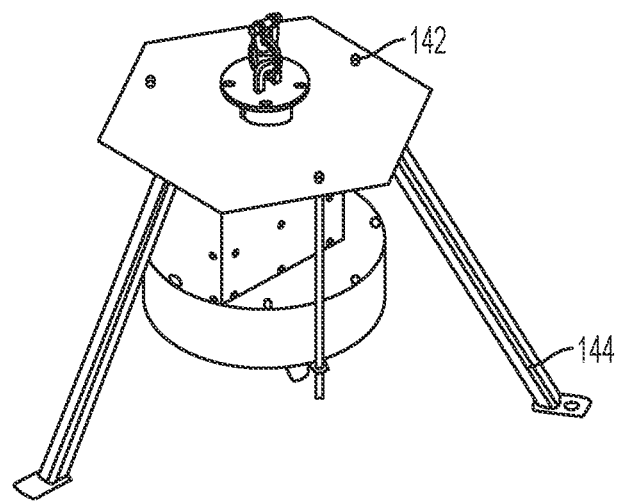
FIG. 3D illustrates additional aspects of a platform of a wind turbine according to an embodiment.
Figure 3E:
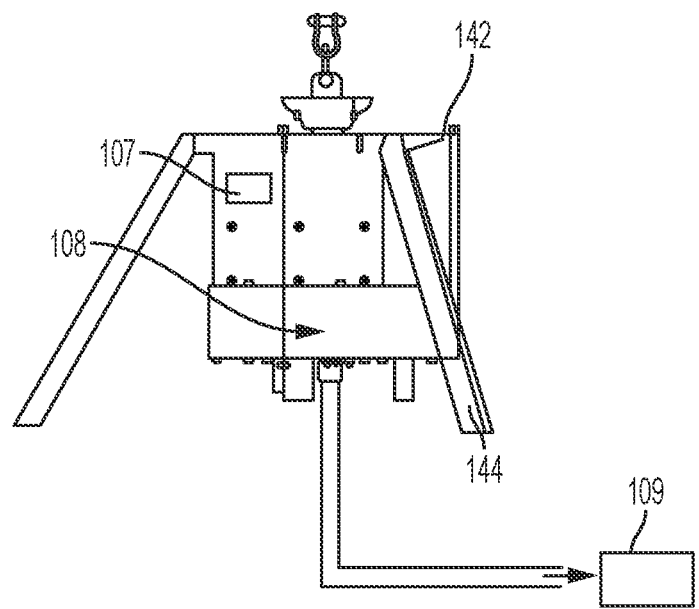
FIG. 3E illustrates additional aspects of a platform of a wind turbine according to an embodiment.
Figure 3F:
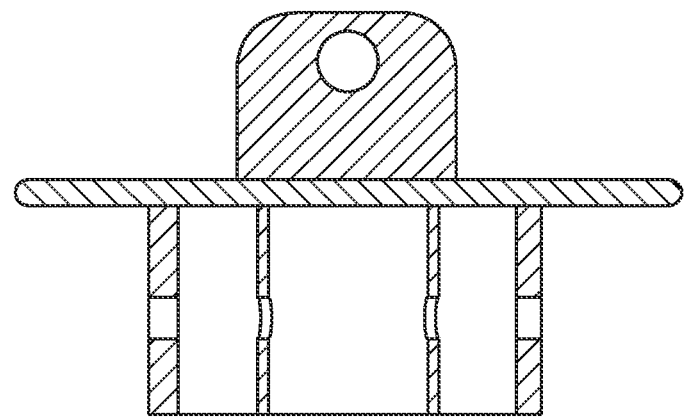
FIG. 3F illustrates additional aspects of a platform of a wind turbine according to an embodiment.
Figure 3G:
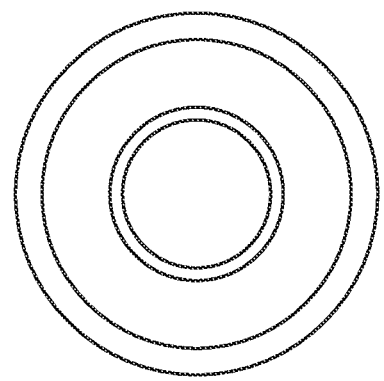
FIG. 3G illustrates additional aspects of a platform of a wind turbine according to an embodiment.
Figure 3H:
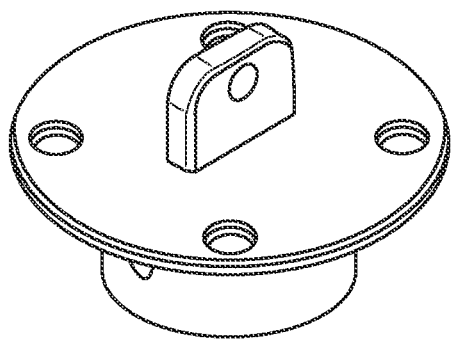
FIG. 3H illustrates additional aspects of a platform of a wind turbine according to an embodiment.

FIG. 2 illustrates a perspective view of a portion of turbine 100 implemented on stand 140 and platform 142. As discussed, stand 140 can, in some embodiments, house generator 108 and have mechanism that allow for energy transfer to a remote location such as, e.g., energy storage 109. From there, energy can be transferred to various end users for different applications. Again, platform 142 can rotate with sails 130 and can be solid (as illustrated in FIG. 2), or comprise spokes or spires (as illustrated in FIG. 1C), where each spoke extends along the length of a bottom edge of a corresponding sail 130.

A six (6) sail turbine with a hexagonal hub and spoke base (e.g., as illustrated in FIG. 1C) can generate power and efficiencies over turbines with a different numbers of sails. This is illustrated where, in FIG. 1C, there is a corresponding sail 130 extending from each spoke 122. Experimental tests reveal that, when airflow across turbine 100 is considered, backwind drag during the upwind portion of an individual sail's cycle is reduced because is falls into the "wind shadow" of the sail ahead of it. At that point, if viewed from the top, the back-winded portion of the cycle is minimal with six (6) sails. There is a point during the cycle where the backwind force equals the forward force and the turbine completely stalls. Accordingly, an optimal function and cost is achieved with six (6) sails. Below that number, the function decreases dramatically. Above that number, the cost increases disproportionately with respect to performance.

Turbine 100 can be collapsible and/or formed from several uncoupleable components to allow ease of transport and/or storage. For example, legs 112 and/or spokes 122 of base 120 can be reversibly coupled to one another for easy assembly and disassembly. Sails 130 can be flexible and collapsible (e.g., capable of being rolled or otherwise reduced in size). The turbine can then be installed for operation to generate energy. Turbine 100 and/or portions thereof can also later be dissembled similarly (e.g., to discontinue operations, to move the turbine, to avoid damage due to high fluid flow, etc.).

Turbine 100 can be lightweight when, e.g., an open base (e.g., as opposed to a solid disk shaped base) is utilized. Sails 130 can be formed of lightweight material to facilitate rotation in wind and/or other fluids. In addition, frame 110 can include material that is lightweight and provides structural strength to turbine 100. Therefore, transport can be facilitated when utilized lightweight embodiments of turbine 100.

In some embodiments, turbine 100 or portions thereof (e.g., sails and/or base) can be elevated from a surface (e.g., the ground). When a lightweight turbine embodiment is utilized, if turbine 100 fails (e.g., collapse of frame 110, uncoupling of components, etc.), less damage can occur with lightweight components of turbine 100.

As mentioned, the energy generated from rotation of sails 130 can be directly and/or indirectly transmitted to a machine capable of accepting the energy (e.g., torque driven machinery, such as pumps). Therefore, irrigation systems, well pumps, showers, etc., can be directly driven by the energy from rotation of sails 130. In some embodiments, the energy from rotating sails 130 can be converted to a different form of energy such as electrical energy (e.g., via a generator) and/or pneumatic energy (e.g., via compression of air). The energy can be stored (e.g., in batteries and/or compressed air containers), in some embodiments.

Turbine 100 can be part of a turbine array and used in conjunction with an energy storage unit(s) 109. To that end, an energy storage unit 109 can be utilized in conjunction with one or more turbines 100 in the array and used to efficiently distribute energy to local or remote locations.

Importantly, the energy storage unit 109 can be utilized in conjunction with the one or more turbines 100 to produce a constant or near constant energy output over time and under varying conditions. That is, during operation, all or a portion of the energy generated by the one or more turbines 100 can be distributed to the energy storage unit 109. During periods of low wind speed, and likewise, low turbine power output, the energy storage unit 109 can be used to increase overall energy output to compensate for a decrease in turbine energy output. During periods of high wind speed, and likewise, high turbine power output, the energy storage unit 109 can be used to provide no or minimal energy output to maintain overall energy output at a constant or near constant level.

Referring to FIGS. 1A-1D and FIG. 2, in some embodiments, stand 140 can be utilized with turbine 100. Generator 108, which can be housed in stand 140, is, of course, utilized as a means to extract power from turbine 100. While generator 108 and stand 140 are, in one respect, ancillary to turbine 100 itself, instantiation of each is necessary for an integrated system, according to some embodiments. In the illustrated embodiment, generator 108 and stand 140 can be generic where a variety of generators, alternators, and gearbox setups are possible beneath a single stand design.

Nevertheless, embodiments are intended to require only minimal cost. To minimize cost and increase operational efficiency, embodiments involve transmitting torque from turbine 100 to generator 108 (which may function as an alternator) and isolating the alternator and its internal bearings from undesirable dynamic loads (anything other than rotating torque) that might be transmitted from turbine 100. Also, embodiments provide solid anchoring of turbine 100 to minimize horizontal and vertical displacement or movement of turbine 100 while allowing rapid, modular deployment of components as well as access for maintenance or replacement/swap-out of components as necessary, with minimal effort, and with safety at the forefront.

Also, it has been recognized that use of an alternator (not shown, in communication generator 108) that operate at the same RPM as turbine 100 becomes less economical as the size of turbine 100 increases. Therefore, a gearbox can be used in generator 108 to "step-up" the RPM rate so that the power of turbine 100 can be matched to the power output and voltage/current ranges of alternator. For a given turbine 100, a single, "one size fits all" stand would be desirable. The 3-stage design of the stand, the gearbox, and the alternator satisfies this.

FIGS. 3A-3H illustrate various views of an embodiment of stand 140. Stand 140 holds an alternator or pump in position beneath turbine 100, to prevent it from rotating. For instance, if turbine 100 is implemented on a watercraft, it would be desirable to house the entire unit in a "hat box" type of arrangement, to keep salt water and spray out of it as much as possible. In any event, the design of components beneath turbine 100 can be ancillary to turbine 100 itself.

The illustrated embodiments enable a gearbox appropriate to almost any alternator, pump or other apparatus to be attached to turbine 100. The upper end of the gearbox fits into a receptacle on the underside of the top plate of stand 140. It is pulled into position by attaching the alternator to the gearbox (matching hardware depends on alternator design), and jacking it upwards into place by alternately rotating the three jackscrew rods. During this process, the shaft at the top of the gearbox moves upwards into position through a hole in the center of the top plate of stand 140. This hole is surrounded by the male end of the labyrinth seal (just a ½-inch high pipe section of proper diameter). Near the top of the shaft, horizontal cross-hole accommodates a bolt which goes through the drive plate and shaft. This arrangement holds the gearbox and alternator securely in place, meeting all of the requirements listed above.

Referring to FIGS. 3A-3H, stand 140 can include platform 142 and a plurality of legs 144. Stand 140 can also house generator 108. Platform 142 can support a machine that is, for example being directly driven by turbine 100 and/or converting the energy produced into a different form of energy (e.g., generator 108). As seen in FIGS. 3A-3H, generator 108 can be coupled to platform 142 of stand 140. Legs 144 of platform 142 can be coupled to the ground proximate turbine 100. Stand 140 can at least partially secure the machine and the connection between the machine and turbine 100 during the stresses of operation (e.g., torque applied to stand 140 from the rotation of sails 130).

Access ports can be added to the gearbox so that it can be inspected and lubricated without dropping the entire box down with the jackscrews and removing the side plate from the gearbox. The exact axis of rotation for the alternator does not need to be aligned with the turbine 100. Only the drive plate at the top of the stand does. Even this can be a little bit off, up to a couple of inches, which is an indication of the robustness of this design.

The following examples illustrate the various end use applications, functionality, and advantages provided by embodiments described herein.

Example 1

In some embodiments, turbine 100 can be utilized in combination with a shelter. For example, turbine 100 can include an external frame, sails, and a base. Sails 130 can be coupled proximate a first end to base 120 and coupled (e.g., directly or indirectly) to the external frame proximate the second opposing end. The external frame can include a first end and a second opposing end. The second opposing end can be disposed proximate the ground. Sails 130 and base can be disposed proximate the first end of frame 110. The external frame can have a height (e.g., distance between the first end and the second end) that provides a shelter for people, animals, and/or other appropriate people or items (e.g., machinery) beneath sails 130. For example, sails 130 can be disposed at a height (e.g., greater than or equal to approximately 6 feet, 8 feet, etc.) above the ground and/or second end of frame 110. As a result, a cavity can be disposed in frame 110 below sails 130. This cavity can be utilized for shelter and/or storage. In some embodiments, a roof can be disposed below sails 130. In some embodiments, sails 130 and/or base member can be coupled to a device (e.g., a generator) to utilize, convert, and/or store the power generated by turbine 100. The device can be disposed on stand 140, on the ground, and/or on a roof of the shelter. Therefore, the assembly with turbine 100 and shelter can provide power and/or shelter to people, animals, and/or other appropriate animals or devices.

Example 2

Figure 4:
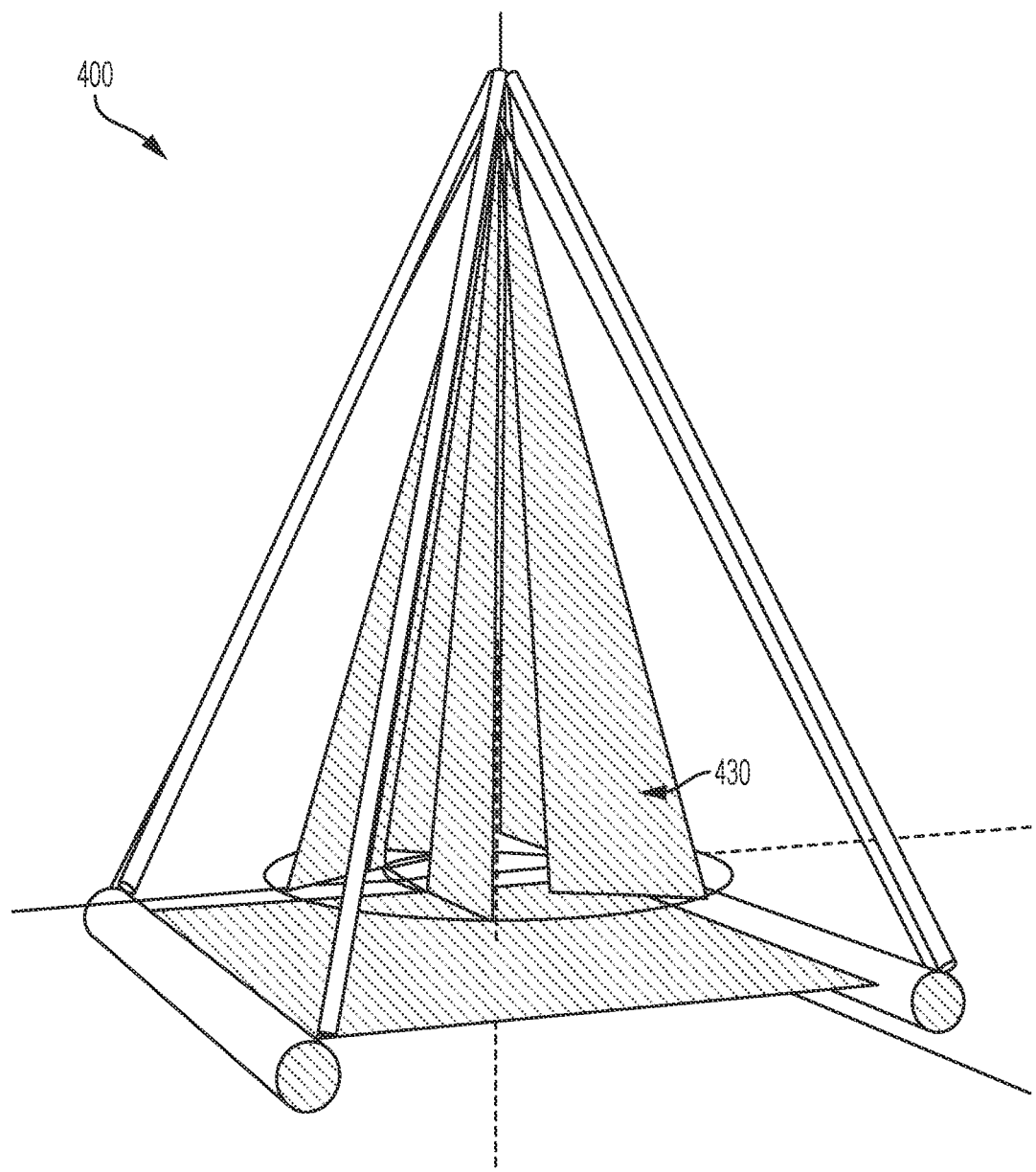
FIG. 4 illustrates an embodiment of a wind turbine according to an embodiment.

Referring to FIG. 4, turbine 100 can be implemented as a watercraft sail turbine 400. For instance, turbine 400 can be implemented on a catamaran or the like. According to such an embodiment, turbine sails 430 absorb wind energy and convert same into rotational torque. The torque can either drive a generator, mechanical linkage to a propeller, or pump mechanism. Energy can be stored in the form of batteries, H2 (fuel cells), compressed air, etc. Advantageously, a water craft can steer in any direction (e.g., unlike a traditional sailboat) and maintain operation of turbine 400. Turbine sails 430 can be raised or lowered at any time. With stored energy the water craft can continue to operate with sails 430 lowered or without wind. The catamaran can be manned or remotely/autonomously piloted. Turbine 400 can be scalable from very small, i.e., <1 meter, to 10 s of meters.

Example 3

Turbine 100 can be used to pump water from a well. Turbine 100 can replace traditional windmills, which can often include heavy metal objects suspended in the air, and/or electrical pumps, which can be costly to operate. The described turbine can be quieter than standard pumps.

Example 4

Turbine 100 can be utilized in combination with water purification systems. Some types of water purifiers (e.g., reverse osmosis) require only that water be pumped through them to purify water. Therefore, turbines can be used to pump water through the water purification system and provide cleaner water to an end user. In conventional water purification systems, power is usually supplied in electrical form, via utility, solar panels, electrical wind turbines, or animal power. However, turbine 100 can be connected directly to pumping mechanisms, eliminating the requirement for electrical subsystems. This setup increases reliability and improves safety, while reducing cost. Further, such a setup can be built at any appropriate scale.

Example 5

Turbine 100 can be used in an inverted arrangement in a body of water. Sails 130 can be rotated by the flow of water over sails 130 and the energy generated can be provided to directly or indirectly drive a machine, converted to another form of energy, and/or stored.

Example 6

A wind turbine can be provided as follows. The vertical axis conical sail turbine is a form of cross flow turbine that is comprised of rigid or flexible (e.g., fabric) sails, supported externally by tensile elements (halyards, etc.) at the top, held open and in shape at the bottom by one or more spar elements.

To enable and facilitate rotation, the suspension arrangement involves the use of a swivel bearing above the top of the wind turbine, to which the halyard and associated rigging is connected. Alternatively, the swivel can be connected directly to the supporting member, provided that the support can be adjusted in order to create the proper tension in sail 130 members (especially if these are non-rigid).

Turbine 100 can be used to perform useful work, as the flow of working fluid (usually air or water) moves generally across and through turbine 100 transverse to turbine 100's axis of rotation. In other words, turbine 100 rotates around a vertical axis in response to generally horizontal fluid flow.

The power of the working fluid impinging on the device is well-known, and expressed as the cube of the velocity (u) of the fluid multiplied by turbine 100's frontal cross sectional area (A), multiplied by the density of the fluid (p or rho), or as the equation:

$$P\_impinging=0.5*u^3*A*p$$

The Power extracted from a given turbine (if that is its intended purpose), is considerably less than the impinging power, and can be represented with the introduction of a coefficient of harvest (C harvest), such that:

$$P\_harvest=P\_impinging*C\_harvest$$

For fluid-based turbines, C_harvest is limited by the Betz limit, and typically much lower. Horizontal axis turbines typically operate with a C harvest of 0.25 to 0.40. Vertical axis turbines have lower C harvest values because a portion of turbine 100 is always driving into the wind, lowering efficiency, creating drag.

Not all wind or fluid energy harvesting situations are best determined by considering only the mechanical efficiency of the device. Overall economic efficiency, or applied utility, given particular circumstances, can offer compelling reasons for the embodiment of less aerodynamically efficient devices. Some of these reasons might include: cost; safety factors; size of individual components and relationship to infrastructure for access and Maintenance; environmental impact; creation of so-called wind-shadows; noise; effects on wildlife (hazards to flying creatures, etc.); aviation hazards; radar interference, and limitations imposed by application (e.g., marine use, portability, etc.).

The wind turbine would therefore be one that for a particular purpose is the best overall fit to a list of requirements and constraints, including but not limited to those listed here.

In Situ measurements of mastless turbine 100, with the originally shown embodiment using a pair of curved sails, have demonstrated C_harvest values in the range of 02 to 0.22 in relatively low wind speeds of up to 8 meters per second. This is considerably greater than the originally anticipated C_harvest of 0.15, which is the range of Savonius turbines (from which the original base shape is derived). The reasons for this apparent increase in C_harvest remain under study, but are believed to be related to the conical shape of sail 130 members, which add a vertical slope component and allow vertical shedding of drag (similar to a motorcycle fairing) that does not occur in a typical Savonius design.

The power from turbine 100 is extracted from a mechanical linkage to turbine 100's base spar (or spar system), in the form of rotational torque, where Power is expressed as a function of the Torque multiplied by the rate of rotation.

The rate of rotation of all forms of sails 130 is limited at the outside edge of turbine 100 by the speed of the wind itself. In other words, the tip speed ratio is at or below approximately 1:1 of that of the wind speed. Application of a load to turbine 100, to extract power, inhibits the rate of rotation. Various forms of tuning of power extraction, usually through gating of electrical power, can be employed so that turbine 100's rotational rate is at its most efficient with respect to the wind speed. Overly dragging turbine 100 results in wasted energy due to turbulence, although in many instances this might be tolerable, as tuned power extraction systems add cost.

Sail Design and Configuration

According to an embodiment, a minimum number of sails is generally considered to be two sails, which also might be made as a single sail with a curvature through the middle (with or without gaps for cross flow of working fluid). Non-cross flow variations are less efficient and are therefore of reduced utility.

The use of curved sails, while aerodynamically desirable, does have its downside. The shape of the curve at base 120 is a complex recurve resulting from the oblique Cone-Shape of Turbine 100

If the curvature is not precisely constructed (which includes all seaming and mounting), turbine sails 130 end up with wrinkles and kinks and are less than ideal, both in performance and aesthetics. Furthermore, as the scale of turbine 100 increases, curved battens must be introduced which increase complexity and cost.

Variations of turbine 100 with more than two sails are envisioned. Among these variations, changes in the curvature of sails 130, including no curvature, are included as potential embodiments. To that end, a variation of turbine 100 with six (6) flat sails can be easily constructed, but any number of sails might be considered. It has been determined that an embodiment with six (6) sails is an attractive configuration, being less costly, easier to construct and transport, etc., than the two (2) sail version.

For a multi-sail version, base 120 (or spar) consists of several identical components (straight or curved, but straight is shown), which can be attached to create the final spar shape. Sails 130 are attached to the spar by various means, including beaded welting, looped fabric over the spar, hold-down lines, etc.

As an example, a perfect hexagonal shape is formed from 6 identical spars, connected to each other at their midpoint. This geometric configuration results in 60 and 30 degree angles, with the spars joined at exactly their midpoints to the end of the succeeding spar. These straight components are easy to store and transport (relative to a curved spar), as they can be bundled and fit into a container or bag. The spar length to overall diameter can be expressed as the tangent function of 30 degrees times base diameter (0.5773*D). This is convenient because construction requires little in the way of precise tooling or measuring of angles—all of the angles are a result of lengths of components.

Base length of sails 130 is nominally from the outermost end of the spar to the midpoint of the spar, but can be more or less as experiments reveal the most economical configuration. More sail material increases costs of materials so must be balanced against energy harvest efficiency. The minimum amount of sail material possible should be employed in turbine 100's construction to minimize cost.

The flat triangular shape of sails 130 in the multi-sail configuration is easy to fabricate, especially if made as flat sails (having no curvature in the radial direction). As a triangle, the letters A, B, and C can be used to designate the bottom inner, bottom outer, and top vertices. By simple geometry, the three-dimensional coordinates of these vertices can be represented by points (x, y, z), where x and y represent the radial plane and z represents the axial plane, and are expressed in whatever measurements units are desired, (e.g., inches, feet, meters, etc.).

These coordinates can be used as inputs into the 3-dimensional distance formula to determine the exact lengths of the 3 legs of the sail triangle (to which there is only a single constructible solution). Once a pattern for a given sized sail is made, sails can be readily produced, and dimensions are independent of choice of fabric, color, etc. Further, computer-aided or otherwise controlled methods can be implemented to determine the dimensions of sails 130 and reproduce same in the most efficient manner.

Adaptations for Use of Mechanical Power

The rotating torque from turbine 100 can be used to directly or indirectly power electrical generators or alternators, with or without RPM/torque translation, inline (on axis) or off axis from turbine 100, or at various angles to turbine 100's axis of rotation. The electricity can be utilized in any way that electricity might be utilized to drive secondary electrical devices of all forms.

The rotating torque from turbine 100 can be used to directly or indirectly power rotating equipment not utilizing electrical means, including: pumps (water, air, or hydraulic) to drive fluid from one location to another, linear equipment (rotational to linear translation), crankshafts, and the like.

Further, use of embodiments described herein include uses in dedicated systems, such as: (1) Manufacture of Hydrogen Gas by means of electrolysis of Water ($H_2O$); (2) Charging of battery systems or connection to battery-based of fuel-cell based systems for localized energy storage; (3) Manufacture of other chemicals (e.g., methane, ammonia); and (4) Direct or electrically operated pumping systems for water purification, desalination, or sewage treatment. As an example, a 1-meter (base diameter turbine) operating at an NCF of 0.2, can produce 50-100 gallons of desalinated potable water per day, enough to meet the survival needs of 50-100 people. A 3-meter turbine, easily set up by one or two persons, will process 9 times as much, enough for over 450 people.

Operation of Groundwater Pumps (Water Wells) Whether of Mechanical or Electrical Form Turbine 100 can also be used in a system to refit to water wells employing traditional "farm windmills." This can be accomplished with a mechanical adaptor to the well's existing down-hole apparatus. The resulting system is less costly and eliminates the climbing hazards associated with the older design. The conical turbine does not need to be directly over the well, as the mechanical power can be transmitted by means of shafts, belts, endless rope drives, etc.

Other end-use applications include: Auxiliary power for a boat, Direct mechanical operation of pumping apparatus on a boat, Bilge & other pumps, Water makers, Power for propulsion of a boat or water craft, Direct linkage to propeller or other thrust-creating system, and Indirect by means of electrical systems (batteries, fuel cells, etc.) to drive electrically driven propulsion devices. Further, one or more turbines might be employed on a vessel for this purpose, with permanent or non-permanent mast structures from which to support turbine 100

Support Structures

As discussed, sails 130 are not supported from the bottom or internally by a central shaft, but from above and below. Any support structure within reason can be used to support turbine 100, provided that it is tall enough for sails 130 to be fully deployed and for other practical matters pertaining to turbine operation, and has sufficient structural integrity to allow turbine 100's sails to be properly tensioned for operation via the halyard.

Categories of turbine support structures include: A line (standing rigging) from tree to ground or another tree or structure, from which one or more turbines can be suspended, Geological features (cliffs, between hillsides), Manmade features, Pre-existing, originally for other purposes (building, towers, masts, etc.), specially built or erected for use by sail turbines, A-frames, Open Tripods (gyns), Arches, tall single-mast tower with guys to support tower and turbines, and Lines (standing rigging) between any of the aforementioned from which one or more turbines can be suspended.

Various forms of self-erecting structures can be employed. Embodiments can be utilized in conjunction with a form of self-erecting tripod and a double A-frame that are both suitable for rapid deployment of the conical sail turbine (as well as other applications). These structures can be quickly raised from a basically flat position on the ground to fully erect by means of a single halyard attached to at or near the top of one member and run through a block or compound block set on the other member.

This structure would be suitable for use on a boat (such as a catamaran) powered by a conical sail system, as it would enable the entire rig to be lowered to deck level when desired or necessary, such as when trailering (ground transport), passing under a low-clearance obstacle, reducing windage or visibility (low detectability) when operating under powered mode.

As a ground-based system, the ability to raise and lower such a structure would be desirable as a one-person installation feature or when an approaching storm (such as a tropical cyclone) approaches.

In general, it is the intention of the inventor that these structures should not require personnel to climb to the top, and that all actions should be possible from the ground via halyards and lanyards. However, it is recognized that there might be special circumstances requiring direct access to the top of the structure. For this, permanent or temporary rungs can be added to one or more legs of the structure (provided that the strength is appropriately rated to handle the weight of a climber). Alternatively, secondary means can be used (ladders, lifts, etc.) to access the top of the structure. In all such circumstances where climbing by a human is to be considered, safety is of the utmost importance.

Another tripod raising method involves connecting all three legs at the vertex, with opposite legs, which form an A-frame, fixed the ground at their bases such that they can freely pivot upwards into deployed position. The third leg is connected to the other two at the vertex between them, and a large pin or other through-fastener holds the vertex together so that the members can be moved into upright position. In this case, base 120 of third member can be pushed or pulled (e.g., by a winch tethered to the A-frame bases) which causes the vertex to rise into position. Once erected, base 120 of the third member is securely anchored so that it will not move laterally on the ground.

Lowering the tripod is simply a matter of reversing the deployment sequence. Base 120 of the third leg is attached to a winch or other mechanism in the direction of the center between the bases of the A-frame legs, in order to control the descent. Base 120 of the third leg is pulled away from the winch while the winch is let out to control the process and prevent the structure from suddenly collapsing. This process is followed until the vertex is close enough to the ground to be supported by a smaller temporary support (or person) and then lowered the remaining distance at the center (the forces on base 120 become too strong as the vertex opening angle approaches 180 degrees).

Another way of raising the tripod is to add sections to each leg from their respective bases. The leg sections would attach by means known to the art. For example, legs 112 can be constructed of sections of pipe, necked down at the upper ends so that they can be inserted into the preceding sections, and secured with locking pins.

Safeguards

Safeguards of various forms can be employed to protect turbine 100 and people/animals from damage or injury as a result of abnormal circumstances. Turbine 100's base spar can be encircled with a hoop to reduce the possibility of collision of a person or animal moving into the spar's rotational zone.

Sensors or trips can be used to determine if an object (typically person or animal) encroaches into turbine 100's safety zone and engage to halt or slow the rotation of turbine 100. Turbine 100 spars can be positioned high enough so as to be out of the way of normal interactions with humans or animals expected to be in the area (e.g., 7-8 feet above ground).

Various means can be employed to automatically trigger release of the halyard in the event of high winds or halyard loads in excess of a predetermined value. Such devices can be purely mechanical, electromechanical, automatic, or remotely controlled. As an example, a trip mechanism can be used to simply release the halyard based on tension loading to the halyard itself. As another example, the halyard might be raised and lowered by a winch mechanism, which might be either hand-cranked or driven by electrical or hydraulic means. Also, the winch might be either manually or autonomously actuated by either on-location control systems or from a remote control point.

Ice buildup on turbine 100's sails can be anticipated under certain weather conditions. Modest ice buildup on turbine 100's sails will have little effect on operation. Moreover, the flexible nature of sails 130 will naturally provide some movement (flexion) that will tend to break ice sheets into fragments and cause the ice to shed without intervention. Due to the relatively slow rotation of turbine 100, horizontal shedding or slinging of ice over significant distances is not a hazard. Ice shedding will tend to be downwards from sails 130. In the event that drifting or shedding of ice builds up to base 120 of the spars, the worst consequence is that turbine 100 won't turn until the ice or snow obstruction is relieved. Base 120 level of turbine 100 can be engineered to account for seasonal snow depths to minimize the potential for snow-related turbine stoppages.

Hailstones are a hazard to many wind turbines, as they can cause pitting of metal blades or create cracks in fiberglass or composite blades. In Horizontal axis turbines, the hail, which is falling vertically, can impact the upward-moving blade tips at relative velocities in excess of 400 mph. In contrast, sail 130 turbines shape and materials render it virtually immune to the effects of hail. The high vertical angle of sails 130 is nearly parallel to the path of the falling hailstones, which impact sails 130 at a very high (glancing) angle. Furthermore, the flexibility of sail 130 material itself yields slightly upon impact and recovers; indeed, the same fabrics used for sails 130 are commonly used at auto dealerships in dedicated hail protection coverings or awnings.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein can be utilized according to the present invention. Accordingly, the appended claims are intended to include within their scope such processes, machines, manufacture, compositions of matter, means, methods, or steps.

The invention claimed is:

1. A mastless vertical axis wind turbine, the mastless vertical axis wind turbine comprising:
   a plurality of sails that during operation of the mastless vertical axis wind turbine rotate about a vertical axis under the influence of wind;
   a platform that during operation of the mastless vertical axis wind turbine is connected to and in tension with the plurality of sails at one or more points about a bottom of the plurality of the sails; and
   an external frame that during operation of the mastless vertical axis wind turbine is connected to and in tension with the plurality of sails at one or more points about a top of the plurality of the sails, where the external frame comprises:
     a plurality of legs that converge above the plurality of sails at a central point about the vertical axis and extend beyond a path swept by the plurality of sails, the plurality of legs remaining stationary during operation of the mastless vertical axis wind turbine while the plurality of sails rotate about the vertical axis.

2. The mastless vertical axis wind turbine of claim 1 further comprising:
   a generator in communication with the platform that generates energy in response to rotation of the platform.

3. The mastless vertical axis wind turbine of claim 2 where the generator is centrally aligned with the vertical axis of rotation.

4. The mastless vertical axis wind turbine of claim 3 further comprising one or more energy storage units in communication with the generator.

5. The mastless vertical axis wind turbine of claim 1 where the external frame further comprises a coupling mechanism that connects the plurality of legs to the plurality of sails and that allows the plurality of sails to rotate about the vertical axis while the plurality of legs remain stationary.

6. The mastless vertical axis wind turbine of claim 1 where the platform comprises:
  a stand that houses a generator and supports the platform; and
  a second plurality of legs extending from the platform at their interior ends and engage the ground at their distal ends.

7. A mastless vertical axis wind turbine, the mastless vertical axis wind turbine comprising:
  a plurality of sails that during operation of the mastless vertical axis wind turbine rotate about a vertical axis under the influence of wind;
  a first stationary support and a second stationary support configured to remain stationary as the plurality of sails rotate under the influence of wind, the first stationary support coupled to the plurality of sails about the vertical axis and a top of the plurality of sails; and
  a bottom platform configured to couple the plurality of sails to the second stationary support, where the bottom platform, during operation of the mastless vertical axis wind turbine, connects to and is in tension with the plurality of sails at one or more points about a bottom of the plurality of the sails and rotates with the plurality of sails under the influence of wind.

8. The mastless vertical axis wind turbine of claim 7 where the bottom platform comprises a plurality of spokes, where each of the plurality of spokes corresponds to a sail of the plurality of sails, and each spoke extends along a length of the bottom of a sail of the plurality of sails.

9. The mastless vertical axis wind turbine of claim 8 where the plurality of spokes comprises six spokes in a hexagonal configuration and each spoke extends along the length of the bottom of a sail of the plurality of sails.

10. The mastless vertical axis wind turbine of claim 7 further comprising:
  a generator in communication with the bottom platform that generates energy in response to rotation of the bottom platform.

11. The mastless vertical axis wind turbine of claim 10 where the generator is centrally aligned with the vertical axis of rotation.

12. The mastless vertical axis wind turbine of claim 11 further comprising one or more energy storage units in communication with the generator.

13. A method for generating energy utilizing a mastless vertical axis wind turbine, the method comprising:
  engaging the mastless vertical axis wind turbine with a first stationary support and a second stationary support that remain stationary under the influence of wind, where the mastless vertical axis wind turbine comprises:
    a plurality of sails that rotate about a vertical axis under the influence of wind, the plurality of sails coupled to the first stationary support about the vertical axis and a top of the plurality of sails; and
    a bottom platform configured to couple the plurality of sails to the first second stationary support, where the bottom platform, during operation of the mastless vertical axis wind turbine, connects to and is in tension with the plurality of sails at one or more points about a bottom of the plurality of the sails and rotates with the plurality of sails under the influence of wind.

14. The method of claim 13 where the bottom platform comprises a plurality of spokes, where each of the plurality of spokes corresponds to a sail of the plurality of sails, and each spoke extends along a length of the bottom of a sail of the plurality of sails.

15. The method of claim 14 where the plurality of spokes comprises six spokes in a hexagonal configuration and each spoke extends along the length of the bottom of a sail of the plurality of sails.

16. The method of claim 13 where the mastless vertical axis wind turbine further comprises a generator in communication with the bottom platform that generates energy in response to rotation of the bottom platform.

17. The method of claim 16 where the generator is centrally aligned with the vertical axis of rotation.

18. The method of claim 17 where the mastless vertical axis wind turbine further comprises one or more energy storage units in communication with the generator.

19. The method of claim 13 where the plurality of sails comprise a surface that is tangential to a coaxial circle around the vertical axis during rotation of the plurality of sails about the vertical axis.

20. A method for generating energy utilizing a mastless vertical axis wind turbine, the method comprising:
  configuring a plurality of sails that during operation of the mastless vertical axis wind turbine rotate about a vertical axis under the influence of wind;
  supporting the plurality of sails utilizing a platform that during operation of the mastless vertical axis wind turbine is connected to and in tension with the plurality of sails at one or more points about a bottom of the plurality of the sails; and
  supporting the plurality of sails utilizing an external frame that during operation of the mastless vertical axis wind turbine is connected to and in tension with the plurality of sails at one or more points about a top of the plurality of the sails, where the external frame comprises a plurality of legs that converge above the plurality of sails at a central point about the vertical axis and extend beyond a path swept by the plurality of sails, the plurality of legs remaining stationary during operation of the mastless vertical axis wind turbine while the plurality of sails rotate about the vertical axis.

21. The method of claim 20 further comprising:
  a generator in communication with the platform that generates energy in response to rotation of the platform.

22. The method of claim 21 where the generator is centrally aligned with the vertical axis of rotation.

23. The method of claim 22 further comprising one or more energy storage units in communication with the generator.

24. The method of claim 20 where the plurality of legs comprises three legs and each of the three legs converge above the plurality of sails at the central point about the vertical axis.

25. The method of claim 20 where the platform comprises:
  a stand that houses a generator and supports the platform; and
  a second plurality of legs extending from the platform at their interior ends and engage the ground at their distal ends.

* * * * *

UNITED STATES PATENT AND TRADEMARK OFFICE
CERTIFICATE OF CORRECTION

PATENT NO. : 11,668,278 B2  
APPLICATION NO. : 17/321271  
DATED : June 6, 2023  
INVENTOR(S) : Steven C. Hench Page 1 of 1

It is certified that error appears in the above-identified patent and that said Letters Patent is hereby corrected as shown below:

In the Claims

At Column 17, Claim number 13, Line number 57, delete "first second stationary support" and replace with --second stationary support--.

Signed and Sealed this
Twenty-fifth Day of July, 2023

Katherine Kelly Vidal
*Director of the United States Patent and Trademark Office*